United States Patent
Tsuchiya (10) Patent No.: US 7,647,149 B2
(45) Date of Patent: Jan. 12, 2010

(54) CONTROL DEVICE FOR ELECTRIC POWER STEERING SYSTEM OF VEHICLE HAVING WHEEL SLIP CONTROL SYSTEM ACTIVE ON STEERED VEHICLE WHEELS

(75) Inventor: Yoshiaki Tsuchiya, Nishikamo-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 260 days.

(21) Appl. No.: 11/663,213

(22) PCT Filed: Oct. 11, 2005

(86) PCT No.: PCT/JP2005/018992

§ 371 (c)(1),
(2), (4) Date: Mar. 20, 2007

(87) PCT Pub. No.: WO2006/041175

PCT Pub. Date: Apr. 20, 2006

(65) Prior Publication Data

US 2008/0097668 A1 Apr. 24, 2008

(30) Foreign Application Priority Data

Oct. 12, 2004 (JP) ............................. 2004-297620

(51) Int. Cl.
*A01B 69/00* (2006.01)
(52) U.S. Cl. .................. 701/41; 180/233; 180/443; 475/18
(58) Field of Classification Search ................. 701/42, 701/41; 180/233, 443; 475/18
See application file for complete search history.

(56) References Cited

U.S. PATENT DOCUMENTS

| 5,469,357 | A | | 11/1995 | Nishimoto |
| 5,894,205 | A | * | 4/1999 | Shimizu et al. ............. 318/432 |
| 6,112,845 | A | * | 9/2000 | Oyama et al. ............... 180/443 |
| 6,148,948 | A | | 11/2000 | Shimizu et al. |
| 6,154,696 | A | * | 11/2000 | Nishi et al. .................... 701/41 |
| 6,687,589 | B2 | * | 2/2004 | Kanda ......................... 701/41 |

FOREIGN PATENT DOCUMENTS

| EP | 1 211 156 A2 | 6/2002 |
| GB | 2 217 276 A | 10/1989 |

(Continued)

*Primary Examiner*—Tuan C To
*Assistant Examiner*—Redhwan Mawari
(74) *Attorney, Agent, or Firm*—Oliff & Berridge, PLC (57) ABSTRACT

The operations of an electric power steering system and a wheel slip control system such as a traction control system or an anti-lock brake system are co-related so as not to undesirably affect one another, by the target assisting steering force for the electric power steering system being modified differently according to whether or not the wheel slip control system is in operation. In doing so, the target value of assisting steering force according to an increase of the steering torque of the steering wheel is increased by a degree increased along with increase of a time based differential of the steering torque of the steering wheel, or the degree of increasing the target value of assisting steering force according to an increase of the steering torque of the steering wheel is decreased along with increase of a time based differential of steering angle of the steering wheel.

7 Claims, 7 Drawing Sheets

FOREIGN PATENT DOCUMENTS

| | | |
|---|---|---|
| JP | A-06-144263 | 5/1994 |
| JP | A-07-156816 | 6/1995 |
| JP | A-10-278814 | 10/1998 |
| JP | A-2004-067040 | 3/2004 |
| WO | WO 01/12492 A1 | 2/2001 |
| WO | WO 2005/019012 A1 | 3/2005 |

* cited by examiner

CONTROL DEVICE FOR ELECTRIC POWER STEERING SYSTEM OF VEHICLE HAVING WHEEL SLIP CONTROL SYSTEM ACTIVE ON STEERED VEHICLE WHEELS

FIELD OF THE INVENTION

The present invention relates to a control device for an electric power steering system of a vehicle in which vehicle wheels steered by a steering wheel are applied with a wheel slip control such as a traction control (TRC) or an anti-lock brake control (ABS).

DESCRIPTION OF THE PRIOR ART

The electric power steering system is well known in the art of vehicles as a system for assisting the steering operation of the driver by turn of the steering wheel, wherein the assisting steering power is generated by an electric motor. On the other hand, the traction control system and the anti-lock brake system are also well known in the art of vehicles as a system for selectively decreasing the traction force of a driving vehicle wheel by a decrease of engine output power or by an application of braking to the driving wheel to avoid an excessive slippage of the wheel on the road surface under a traction, and a system for selectively loosening a braking force applied to the wheel also to avoid an excessive slippage of the wheel on the road surface under a braking, respectively. As an art of co-relating the operations of the electric power steering system and the anti-lock brake system, it is described in Japanese Patent Laid-open Publication Hei 10-315992 to increase a viscous resistance of the steering system during the operation of the electric power steering system for the purpose of suppressing a vibration being transmitted from the steered vehicle wheel under an anti-lock brake control to the steering wheel which is liable to occur during the operation of the anti-lock brake system.

DISCLOSURE OF THE INVENTION

It is a principal object also of the present invention to co-relate the operations of the electric power steering system and the wheel slip control system like the traction control system or the anti-lock brake system so as to suppress in a more effective manner that the steering system assisted by the electric power steering system is undesirably affected by the operation of the wheel slip control system.

It is a further object of the present invention to co-relate the operations of the electric power steering system and the wheel slip control system like the traction control system or the anti-lock brake system such that an apparent vibration component generated in a steered vehicle wheel is more effectively suppressed from transmitting toward the steering wheel when the wheel slip control system is in operation.

It is a further object of the present invention to co-relate the operations of the electric power steering system and the wheel slip control system such that the steering of the steered vehicle wheels by the assisting force of the electric power steering system is more effectively refrained from overshooting when the wheel slip control system is in operation so as not to affect the wheel slip control.

According to the present invention, the above-mentioned principal object is accomplished by a control device for an electric power steering system of a vehicle having a steering wheel, a pair of vehicle wheels adapted to be steered by the steering wheel, and a wheel slip control system such as a traction control system or an antilock brake system active on the steered vehicle wheels, comprising a computing system for calculating a target value of assisting steering force to be generated by the electric power steering system so as to increase according to an increase of the steering torque of the steering wheel in a manner different according to whether or not the wheel slip control system is in operation.

By the electric power steering system being controlled by calculating a target value of assisting steering force to be generated by the electric power steering system so as to increase according to an increase of the steering torque of the steering wheel in a manner different according to whether or not the wheel slip control system is in operation as described above, the operation of the electric power steering system is adjusted according to whether or not the wheel slip control system like the traction control system or the antilock brake system is in operation, so that the operation of the electric power steering system is properly co-related with the operation of the wheel slip control system like the traction control system or the antilock brake system.

In this case, the computing system may increase the target value of assisting steering force according to an increase of the steering torque of the steering wheel by a degree increased along with increase of a time based differential of the steering torque of the steering wheel. By such an arrangement, in varying the increasing of the target value of assisting steering force to be generated by the electric power steering system according to an increase of the steering torque of the steering wheel according to whether or not the wheel slip control system is in operation, the effect of the magnitude of the time based differential of the steering torque of the steering wheel is incorporated in the control so that the steering assist control is more properly executed.

In this case, further, the computing system may increase the target value of assisting steering force according to an increase of the steering torque of the steering wheel by such a degree increased along with increase of a time based differential of the steering torque of the steering wheel that is decreased along with increase of vehicle speed. By such an arrangement, in increasing the target value of assisting steering force according to an increase of the steering torque of the steering wheel by a degree increased along with increase of a time based differential of the steering torque of the steering wheel, the degree is changed so as to incorporate the effect of the magnitude of vehicle speed.

In this case, further, the electric power steering system may have an input member rotated by the steering wheel, and the degree of increasing the target value of assisting steering force according to an increase of the steering torque of the steering wheel may be increased along with increase of a time based differential of the steering torque of the steering wheel more when directions of a time based differential of torque transmitted through the input member and a time based differential of rotational angle of the input member during operation of the wheel slip control system is different from each other than when those directions are the same with each other. By such an arrangement, the operations of the electric power steering system and the wheel slip control system like the traction control system or the anti-lock brake system are co-related such that an apparent vibration component generated in a steered vehicle wheel is more effectively suppressed from transmitting toward the steering wheel when the wheel slip control system is in operation.

Or alternatively, the computing system may decrease a degree of increasing the target value of assisting steering force according to an increase of the steering torque of the steering wheel along with increase of a time based differential of steering angle of the steering wheel.

By so decreasing the degree of increasing the target value of assisting steering force according to an increase of the steering torque of the steering wheel along with increase of a time based differential of steering angle of the steering wheel, a damping effect is given to the power steering so as to suppress the steering of the steered wheels from overshooting under the assist of the electric power steering system particularly when the wheel slip control which affects the power steering is being executed, so that a more proper steering assist control is obtained by co-relating the electric power steering system and the wheel slip control system with incorporation of the speed of operation of the steering wheel.

In this case, further, the computing system may decrease a degree of increasing the target value of assisting steering force according to an increase of the steering torque of the steering wheel along with increase of a time based differential of steering angle of the steering wheel more along with increase of vehicle speed. By such an arrangement, in decreasing a degree of increasing the target value of assisting steering force according to an increase of the steering torque of the steering wheel along with increase of a time based differential of steering angle of the steering wheel more along with increase of vehicle speed, a damping effect is given according to the steering speed of the steering wheel, so that a more proper steering assist control is obtained according to the magnitude of the steering speed of the steering wheel with incorporation of vehicle speed.

In this case, further, the computing system may decrease a degree of increasing the target value of assisting steering force according to an increase of the steering torque of the steering wheel along with increase of a time based differential of steering angle of the steering wheel less along with increase of steering torque of the steering wheel. By such an arrangement, the magnitude of the steering torque of the steering wheel is incorporated into giving the damping effect.

In any case, further, when operation of the wheel slip control system ends, the modification of the target value of assisting steering force during the operation of the wheel slip control system may be continued until a determined time lapses from the time point of the end of the operation of the wheel slip control system.

Further, the computing system may decrease the target value of assisting steering force along with increase of vehicle speed.

The operations and effects of the abovementioned control systems constructed as described above will become clearer from the descriptions about the embodiments thereof made in the following with reference to the drawings.

BEST MODE EMBODIMENTS OF THE INVENTION

In the following, the present invention will be described in more detail with respect to a preferred embodiment thereof by referring to the accompanying drawings.

Figure 1:
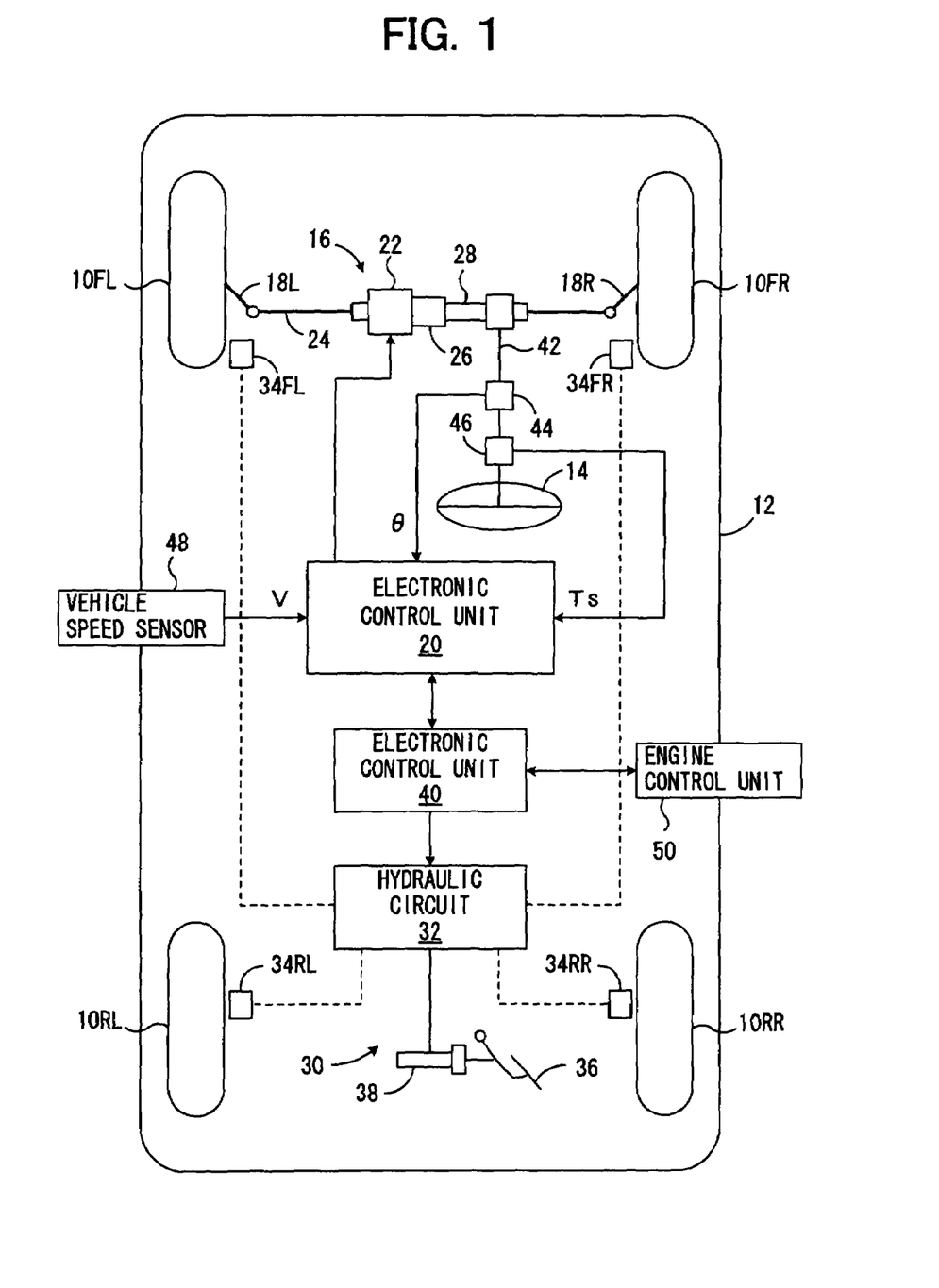
FIG. 1 is a diagrammatical illustration of a vehicle showing constructional elements concerned with the control device according to the present invention.

In FIGS. 1, 10FL, 10FR, 10RL and 10RR are front left, front right, rear left and rear right vehicle wheels suspended to a vehicle body 12 by wheel suspension means not shown in the figure. The front left and front right wheels 10FL and 10FR are steering vehicle wheels steered by a steering wheel 14 operated by a driver and an electric power steering system generally designated by 16, via steering arms 18L and 18R, respectively. 20 is an electronic control unit incorporating a microcomputer.

The electric power steering system 16 includes an electric motor 22 which drives a rack bar 24 via a ball-screw motion transformer 26 to shift leftward or rightward, so that the steering arms 18L and 18R pivotably connected with opposite ends of the rack bar 24 turn the steering vehicle wheels 10FL and 10FR around king pins not shown in the figure. In the shown embodiment, the front steered vehicle wheels 10FL and 10FR are driven by a power source not shown in the figure, which may be a conventional engine or a hybrid system incorporating an engine and one or two motor-generators.

30 designates a brake system including a hydraulic circuit 32 not shown in detail but well known in the art adapted to selectively supply a braking hydraulic pressure to wheel cylinders 34FL, 34FR, 34RL and 34RR to apply braking forces to brake disks incorporated in the wheels 10FL, 10FR, 10RL and 10RR, though not shown in detail in the figure, since these devices are well known in the art. The hydraulic circuit 32 is also connected with a manual brake system including a brake pedal 36 and a master cylinder 38 also well known in the art, so that the wheel cylinders 34FL, 34FR, 34RL and 34RR are supplied with a braking hydraulic pressure from the master cylinder 38 according to a depression of the brake pedal 36 by a driver when the vehicle is normally braked under the braking operation of the driver. 40 is a sub electronic control unit for executing a vehicle stability control by automatically controlling the hydraulic circuit 32 as known in various manners in this art.

42 is a steering shaft supporting the steering wheel 14 to be rotated thereby according to a steering operation of the driver and to manually shift the rack bar 24 by a pinion not shown in the figure. 44 is a steering angle sensor for detecting the angle of steering rotation of the steering shaft 42 and sending a signal showing the steering angle θ to the electronic control unit 20. 46 is a torque sensor for detecting the steering torque transmitted through the steering shaft 42 and sending a signal showing the torque Ts transmitted through the steering shaft 42 to the electronic control unit 20. 48 is a vehicle speed sensor for detecting vehicle speed in a manner known in this art to send a signal showing vehicle speed V to the electronic control unit 20. 50 is an engine control unit which cooperates with the sub electronic control unit 40 to execute a traction control in the manner well known in this art.

The operation of the control device for the electric power steering system 16 according to the present invention is indeed carried out by the electronic control unit 20 according to a control program stored therein according to the present invention. The control will be described with respect to an embodiment in the following by referring to FIGS. 2-11.

Figure 2:
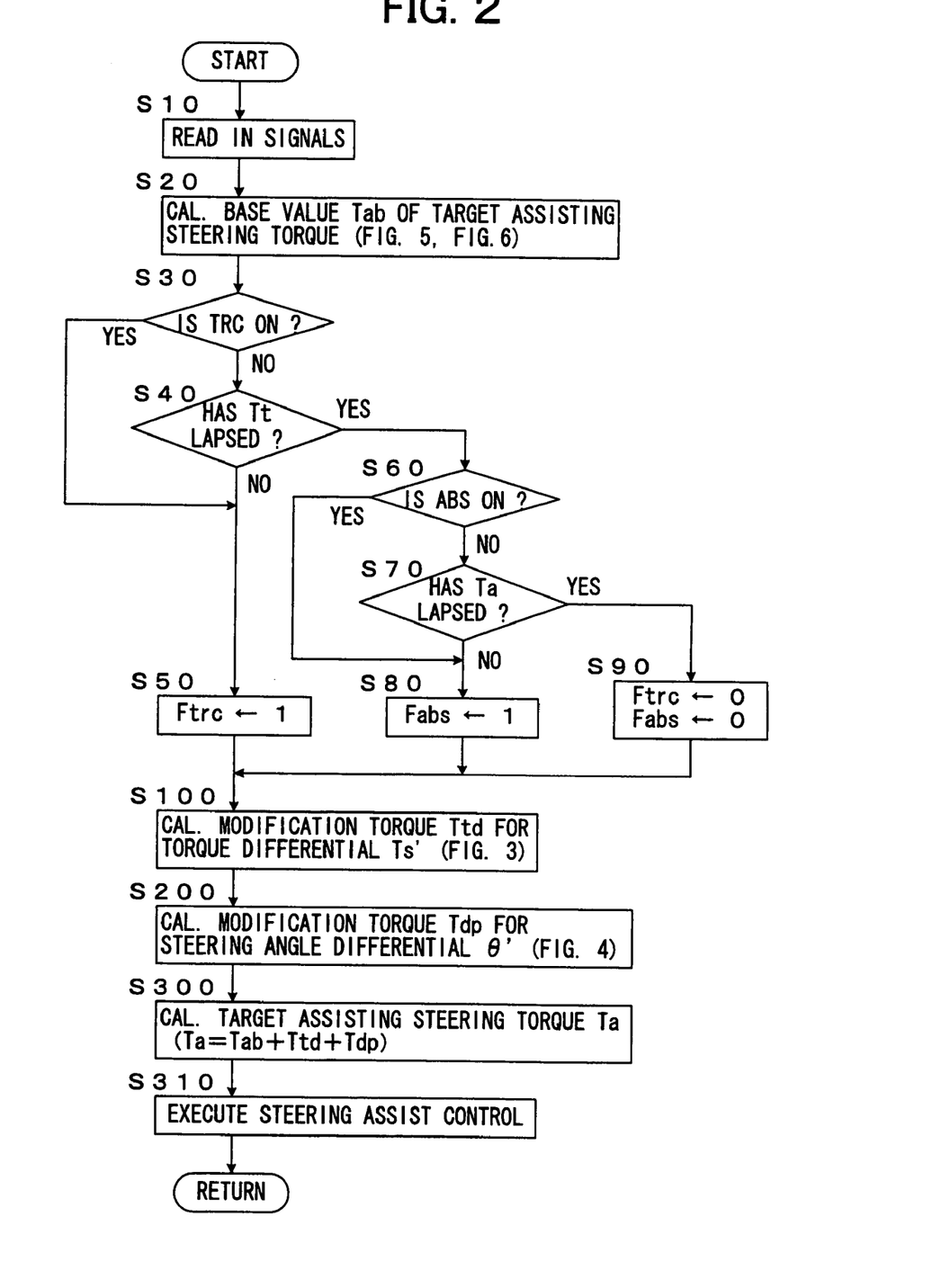
FIG. 2 is a flowchart showing the main routine of the operation of the control device according to the present invention.

FIG. 2 is a flowchart showing the main routine of the control. The control according to this main routine is started when an ignition switch not shown in the figure is closed and cyclically repeated during the operation of the vehicle at a cycle time such as 10-100 microseconds.

When the control is started, in step 10, signals are read in from the steering angle sensor 44, the steering torque sensor 46, the vehicle speed sensor 48 and others not shown in the figure.

Figure 5:
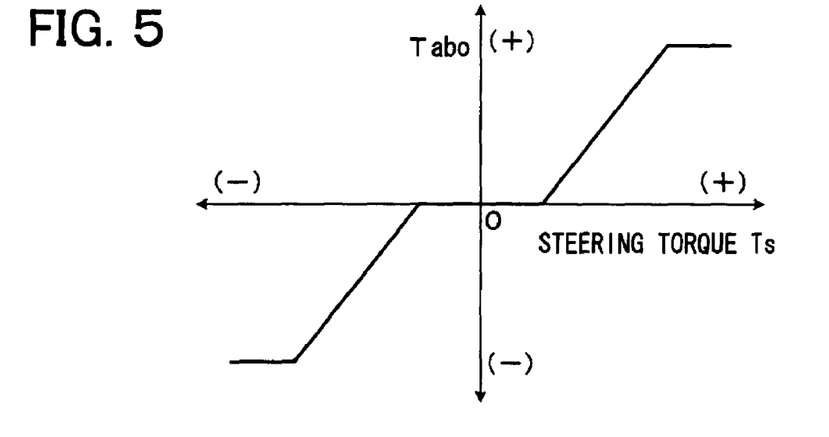
FIG. 5 is a map showing the relationship between steering torque and a base value of a target assisting steering force.
Figure 6:
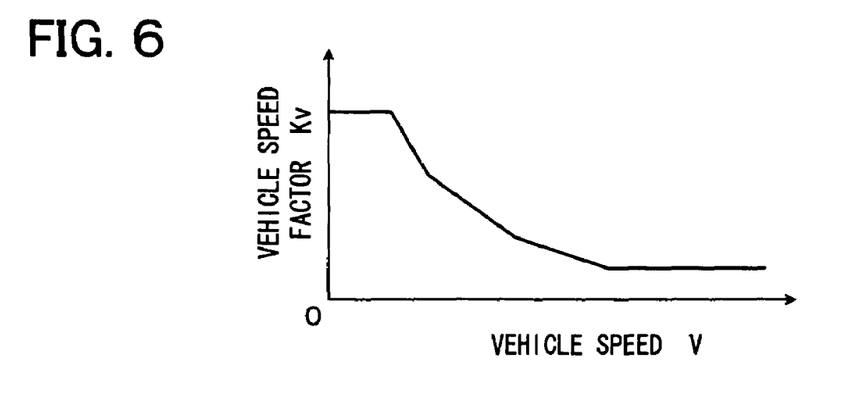
FIG. 6 is a map showing the relationship between vehicle speed and a factor for modifying the base value of the target assisting steering force.

Then, in step 20, a base value of a target assisting steering force to be generated by the electric power steering system is calculated according to a steering torque of the steering wheel and vehicle speed. In the shown embodiment, the base value of the target assisting steering force is calculated as a torque base value Tab of a target assisting steering torque by referring to maps such as shown in FIGS. 5 and 6. In more detail, a provisional value Tabo for the base value Tab of the target assisting steering torque is calculated according to the steering torque Ts of the steering wheel by referring to the map of FIG. 5, such that Tabo increases according to an increase of the steering torque Ts, provided that the values for the left and right turn of the vehicle are expressed by positive and negative values, respectively, while a vehicle speed factor Kv is calculated according to the vehicle speed V by referring to the map of FIG. 6, such that Kv decreases according to an increase of the vehicle speed V, and then the base value Tab of the target assisting steering torque is calculated as Tab=Kv·Tabo.

Then, in step 30, it is judged if the traction control is being executed. When the answer is yes, the control bypasses step 40 to proceed to step 50, while when the answer is no, the control proceeds to step 40. In step 40, it is judged if a predetermined time Tt has lapsed after the end of the traction control. This step is provided to take a delay time before ending the control against the execution of the traction control according to the present invention described hereinbelow when the traction control has ended, because the electric power steering system is quicker in getting off than the traction control system incorporating some inertial components. The delay time Tt may be of the order of 500 milliseconds. When the answer of step 40 is no, the control proceeds to step 50. In step 50, a flag Ftrc, which is reset to 0 at the start of the control operation through the flowchart of FIG. 2, or in step 90 described hereinunder, is set to 1 to show that the traction control is in operation.

When the answer of step 40 is yes, the control proceeds to step 60, and it is judged if the anti-lock brake system is in operation. When the answer is yes, the control bypasses step 70 to proceed to step 80, while when the answer is no, the control proceeds to step 70. In step 70, it is judge if a predetermined time Ta has lapsed after the end of the anti-lock brake control. This step is also provided to take a delay time before ending the control against the execution of the anti-lock brake control according to the present invention described hereinbelow when the anti-lock brake control has ended, also because the electric power steering system is quicker in getting off than the anti-lock brake system incorporating some inertial components. The Ta may also be of the order of 500 milliseconds. While the answer of step 70 is no, the control proceeds to step 80. In step 80, a flag Fabs, which is also reset to 0 at the start of the control operation through the flowchart of FIG. 2, or in step 90 described hereinunder, is set to 1 to show that the anti-lock brake control is in operation.

When the answer of step 70 is yes, the control proceeds to step 90, and the flags Ftrc and Tabs are both reset to 0, to show that neither the traction control nor the anti-lock brake control is executed.

From either of steps 50, 80 and 90 the control proceeds to step 100. In this step, a modification torque Ttd for modifying the base value Tab of the target assisting steering torque according to a time-based differential of the steering torque Ts is calculated according to the sub routine shown in FIG. 3.

Figure 3:
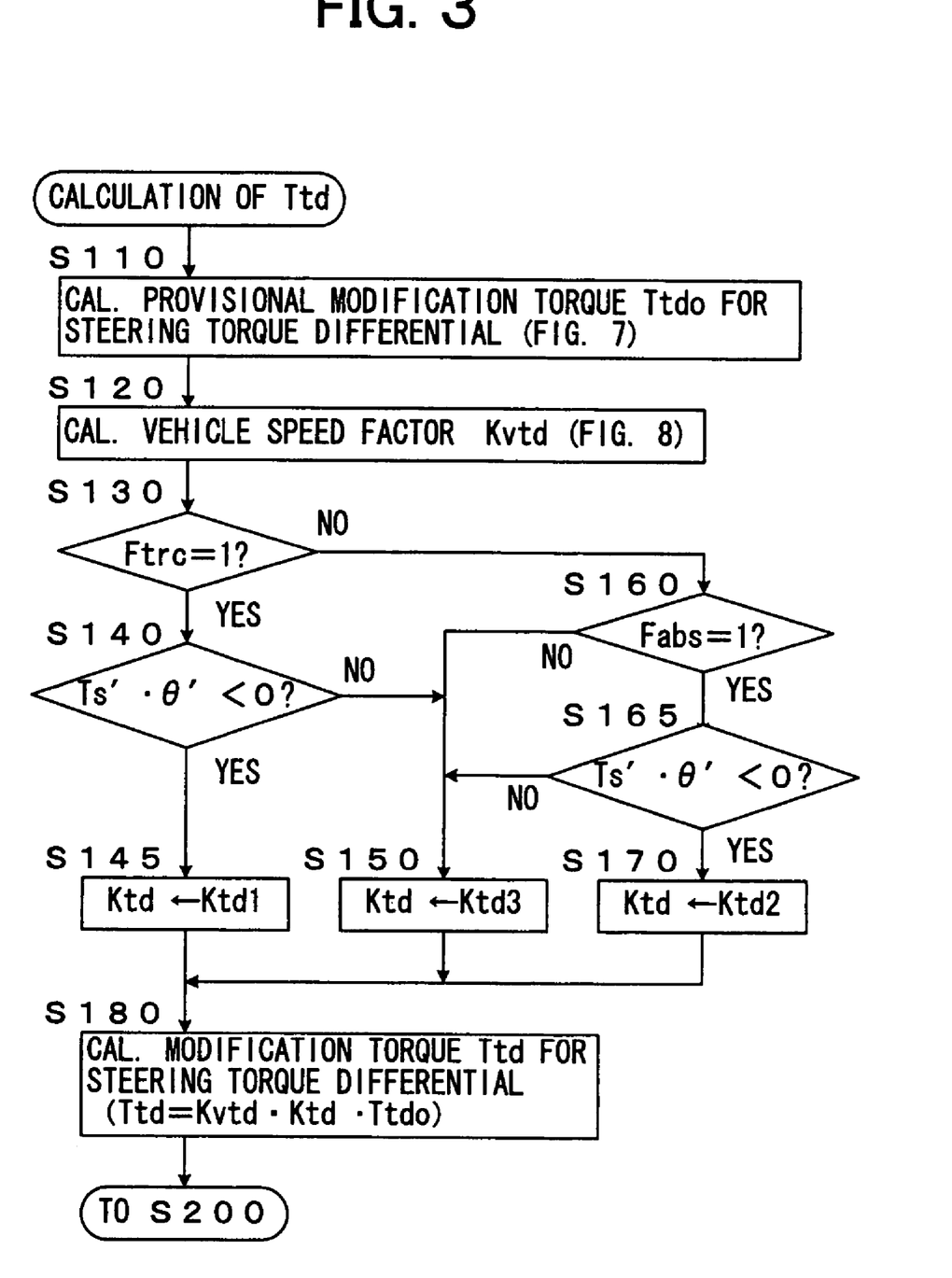
FIG. 3 is a flowchart showing a sub routine of the operation executed in step 100 of the main routine.
Figure 7:
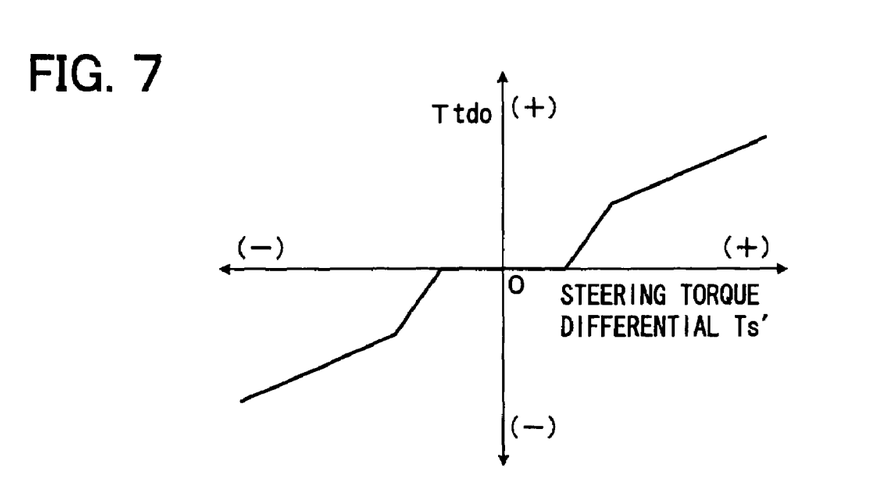
FIG. 7 is a map showing the relationship between a time-based differential of the steering torque and an amount Ttdo for modifying the base value of the target assisting steering force.

Temporarily transferring to the sub routine for calculation of Ttd shown in FIG. 3, in step 110, a provisional value Ttdo for a modification torque Ttd is calculated according to a time-based differential Ts' of the steering torque Ts by referring to a map such as shown in FIG. 7, such that Ttdo increases according to an increase of Ts', provided that the values for the left and right turn of the vehicle are expressed by positive and negative values, respectively.

Figure 8:
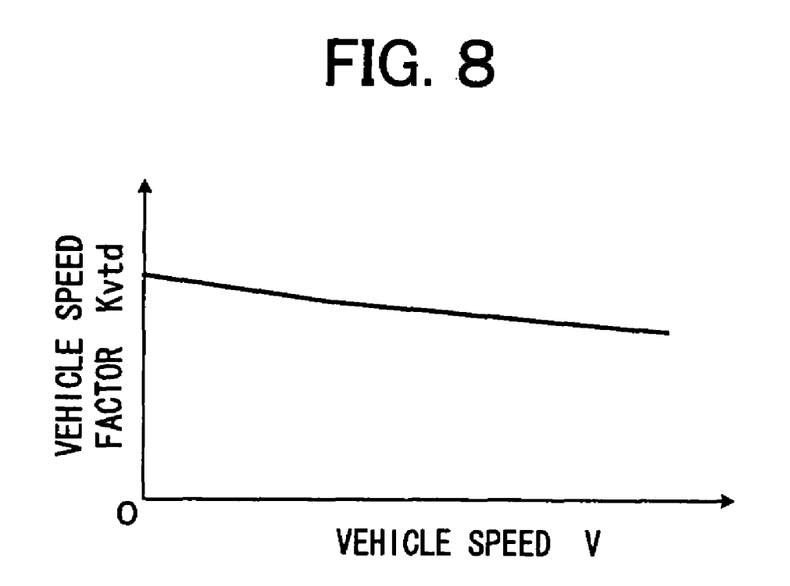
FIG. 8 is a map showing the relationship between vehicle speed and a factor for modifying the above-mentioned amount Ttdo.

In step 120, a vehicle speed factor Kvtd is calculated according to the vehicle speed V by referring to a map such as shown in FIG. 8, such that Kvtd slightly decreases according to an increase of the vehicle speed.

Then, in step 130, it is judged if the flag Ftrc is 1, i.e., if the traction control is on (including the delay time Tt). When the answer is yes, the control proceeds to step 140, and it is judge if a product of the time-based differential Ts' of the steering torque Ts and a time-based differential θ' of the steering angle θ is negative, i.e., Ts'·θ'<0. This is to judge if the steering shaft 42 is being applied with an inverse torque input against the direction of change of the steering angle θ, probably acting from the steered vehicle wheel toward the steering wheel as more liable to occur when the traction control is being executed. Such an inverse torque input, when applied to the steering wheel, will damage the steering feeling of the driver. Therefore, when the answer of step 140 is yes, the control proceeds to step 145, and a factor Ktd is set to a value Ktd1 which is larger than a value Ktd3 in step 150 to which the control proceeds when the answer of step 140 is no, so as to correspondingly increase the modification torque Ttd described hereinunder for modifying the base, value Tab for the target assisting steering torque Ta against the inverse torque input. When the answer of step 140 is no, the control proceeds to step 150, and the factor Ktd is set to Ktd3 which is smaller than Ktd1 as described above.

When the answer of step 130 is no, the control proceeds to step 160, and it is judged if the flag Fabs is 1, i.e., if the anti-lock brake control is on (including the delay time Ta). When the answer is yes, the control proceeds to step 165, and it is judged if the product Ts'·θ' is negative or not in the same manner as in step 140. This is also to judge if an inverse torque input is applied to the steering shaft 42 as also more liable to occur when the anti-lock brake control is being executed. When the answer is yes, the control proceeds to step 170, and the factor Ktd is set to a value Ktd2 which is also larger than the value Ktd3. The magnitude of Ktd1 and Ktd2 reflecting thereon the effect of suppressing the above-mentioned inverse torque input against the influence of the execution of the traction control and the anti-lock brake control, respectively, may be determined appropriately according to the designs of respective vehicles such that Ktd1 is larger than Ktd2, Ktd1 is smaller than Ktd2, or Ktd1 is equal to Ktd2, both being, however, larger than Ktd3.

In any event, then the control proceeds to step 180, and a modification torque Ttd for modifying the base value Tab of the target assisting steering torque according to the time-based differential Ts' of the steering torque Ts is calculated as Ttd=Kvtd·Ktd·Ttdo, so that the modification torque Ttd is increased according to an increase of the time-based differential Ts' of the steering torque Ts, particularly more when the traction control or the anti-lock brake control is being executed and the inverse torque input is applied to the steering shaft. After the execution of the sub routine of FIG. 3, the control proceeds to step 200 in the main routine of FIG. 2.

Figure 4:
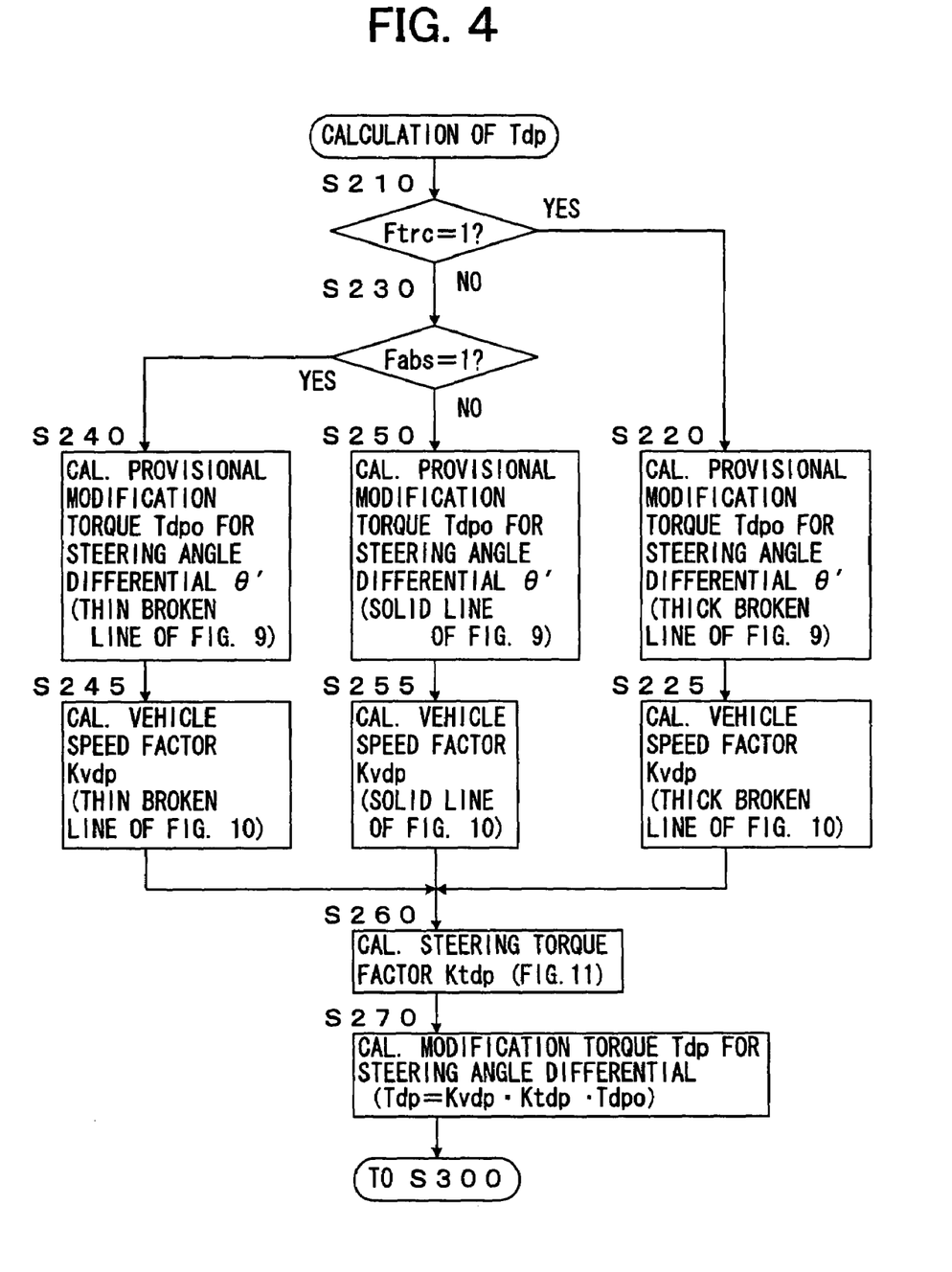
FIG. 4 is a flowchart showing a sub routine of the operation executed in step 200 of the main routine.

Returning to the main routine of FIG. 2, in step 200, a modification torque Tdp for modifying the base value Tab of the target assisting steering torque Ta according to a time-based differential of the steering angle is calculated according to the sub routine of FIG. 4. This modification provides a damping effect to the steering operation so that the power assist steering does not overshoot.

Figure 9:
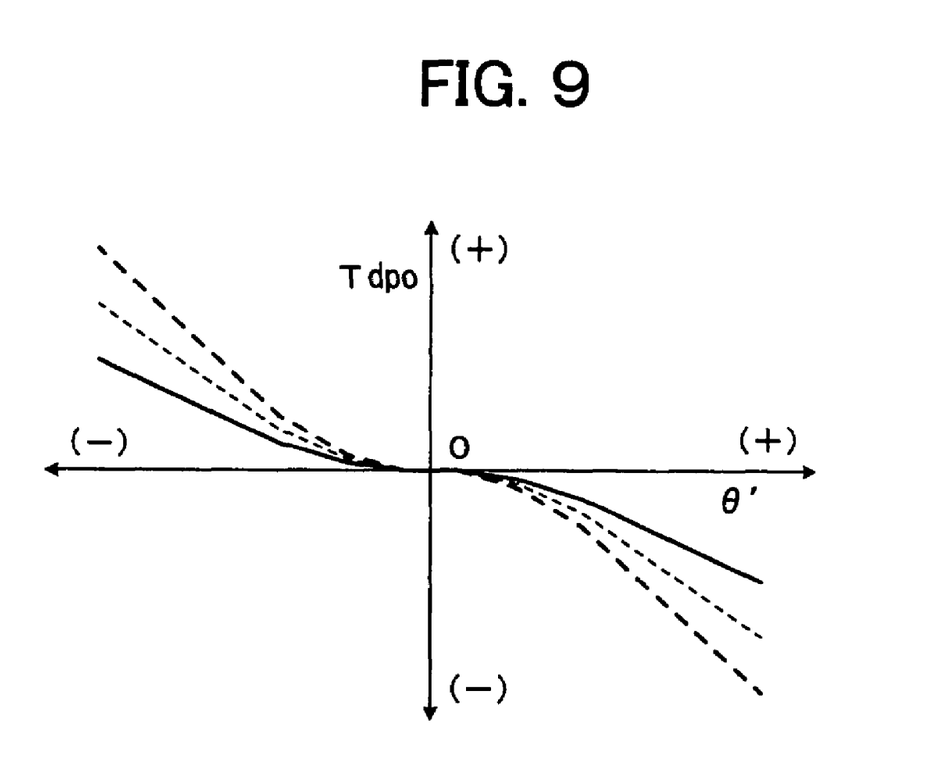
FIG. 9 is a map showing the relationship between a time-based differential of the steering angle and an amount Tdpo for modifying the base value of the target assisting steering force.
Figure 10:
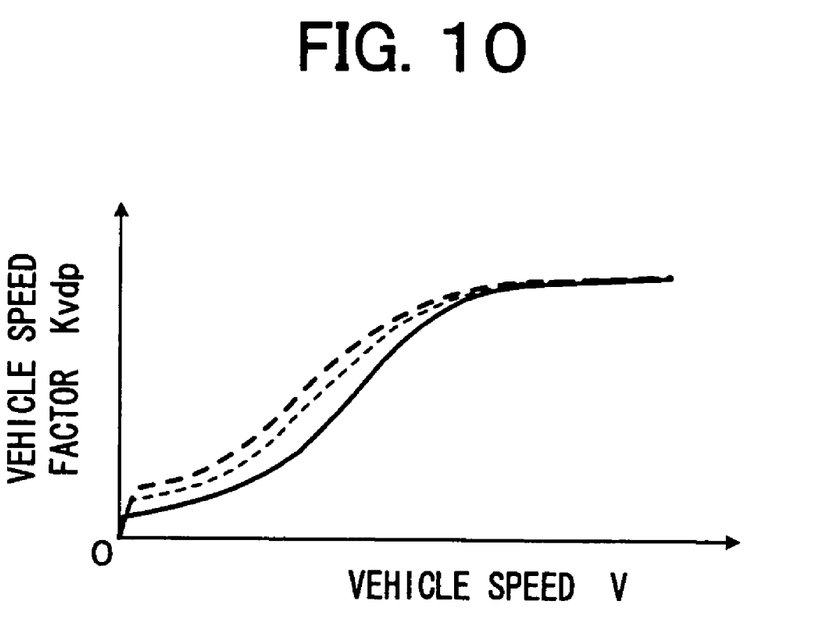
FIG. 10 is a map showing the relationship between vehicle speed and a factor for modifying the above-mentioned amount Tdpo.

Again temporarily transferring to the sub-routine for calculation of Tdp shown in FIG. 4, in step 210, it is judged if the flag Ftrc is 1, i.e., if the traction control is on (including the delay time Tt). When the answer is yes, the control proceeds to step 220, and a provisional value Tdpo for a modification torque Tdp according to a time-based differential θ' of the steering angle θ is calculated by referring to a map such as shown in FIG. 9, particularly according to the thick broken line in the map, such that Tdpo is increased in most in the negative value according to an increase of θ', provided that the values for the left and right turn of the vehicle are expressed by positive and negative values, respectively. In this case, the control proceeds further to step 225, and a vehicle speed factor Kvdp for further modifying the provisional value Tdpo is calculated according to the vehicle speed V by referring to a map such as shown in FIG. 10, particularly according to the thick broken line thereof, such that Kvdp increases in most according to an increase of the vehicle speed V.

When the answer of step 210 is no, the control proceeds to step 230, and it is judged if the flag Fabs is 1, i.e., if the anti-lock brake control is on (including the delay time Ta). When the answer is yes, the control proceeds to step 240, and the provisional value Tdpo for the modification torque Tdp according to the time-based differential θ' of the steering angle θ is calculated by referring to the map of FIG. 9, particularly according to the thin broken line thereof, such that Tdpo is increased in medium in the negative value according to an increase of θ'. In this case, the control proceeds further to step 245, and the factor Kvdp is calculated according to the vehicle speed V by referring to the map of FIG. 10, particularly according to the thin broken line thereof, such that Kvdp increases in medium according to an increase of the vehicle speed V.

When the answer of Step 230 is no, the control proceeds to step 250, and the provisional value Tdpo for the modification torque Tdp according to the time-based differential θ' of the steering angle θ is calculated by referring to the map of FIG. 9, particularly according to the solid line thereof, such that Tdpo is increased in least in the negative value according to an increase of θ'. In this case, the control proceeds further to step 255, and the factor Kvdp is calculated according to the vehicle speed V by referring to the map of FIG. 10, particularly the solid line thereof, such that Kvdp increases in least according to an increase of the vehicle speed V.

Figure 11:
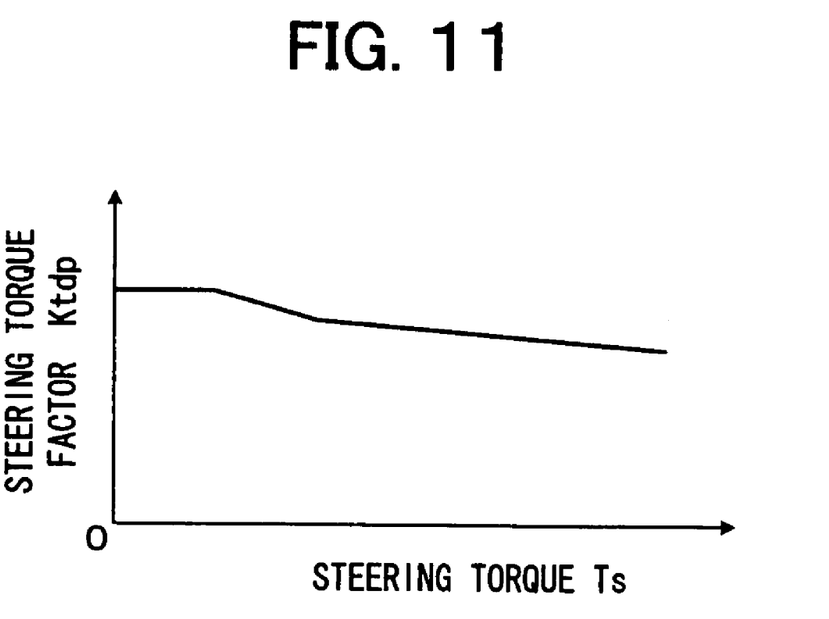
FIG. 11 is a map showing the relationship between the steering torque and a factor for modifying the above-mentioned amount Tdpo.

In either of the above three cases, the control proceeds further to step 260, and a steering torque factor Ktdp for further modifying the provisional value Tdpo according to the steering torque Ts is calculated by referring to a map such as shown in FIG. 11, such that Ktdp is slightly decreased according to an increase of the steering torque.

Then, in step 270, the modification torque Tdp for modifying the base value Tab for the target assisting steering torque Ta according to the time-based differential θ' of the steering angle θ is calculated as Tdp Kvdp·Ktdp·Tdpo.

As will be understood from the map of FIG. 9, the modification torque Tdp according to the time-based differential θ' of the steering torque θ is increased in the absolute value thereof as a negative value according to an increase of the time-based differential θ' of the steering angle θ, reflecting thereon the damping effect of the steering system not to allow the power assist steering to overshoot, particularly more when the traction control or the anti-lock brake control is being executed, so that the wheel slip control is not adversely affected by an overshooting of the power assist steering. The manner of more increasing the absolute value of the modification torque Tdp in the negative value according to an increase of the time-based differential θ' of the steering angle θ when the traction control or the anti-lock brake is being executed may be appropriately determined according to the designs of respective vehicles more than when neither the traction control nor the anti-lock brake control is executed. In the shown embodiment, the absolute value of the modification torque Tdp is more increased when the traction control is being executed than when the anti-lock brake control is being executed. The same difference in the effects of the traction control and the anti-lock brake control is reflected on in the factor Kvdp as will be seen in the map of FIG. 10.

From step 270 of the sub routine of FIG. 4, the control proceeds to step 300 of the main routine of FIG. 2, and the target assisting steering torque Ta is calculated as a sum of Tab, Ttd and Tdp, i.e., Ta=Tab+Ttd+Tdp, so that the base value Tab for the target assisting steering torque Ta calculated based upon the maps of FIGS. 5 and 6 is increased by the torque Ttd calculated according to the sub routine of FIG. 3 and is decreased by the torque Tdp calculated according to the sub routine of FIG. 4. Although the modification for the target assisting steering torque by the modification torque Ttd calculated by the sub routine of FIG. 3 and the modification torque Tdp calculated by the sub routine of FIG. 4 are effected in the adding and subtracting manner in the shown embodiment, the modification according to the sub routines of FIGS. 3 and 4 may be made in a multiplying manner by appropriately transforming the values of Ttd and Tdp into multiplying factors.

Then, finally, in step 310, the steering assist control is executed according to the target assisting steering torque Ta calculated in the above-mentioned manner.

Although the present invention has been described in detail with respect to a particular embodiment thereof, it will be apparent for those skilled in the art that various modifications are possible within the scope of the present invention.

The invention claimed is:

1. A control device for an electric power steering system of a vehicle having a steering wheel, a pair of vehicle wheels adapted to be steered by the steering wheel, and a wheel slip control system including a traction control system or an antilock brake system active on the steered vehicle wheels, comprising a computing system for calculating a target value of assisting steering force to be generated by the electric power steering system so as to increase according to an increase of the steering torque of the steering wheel and further so as to increase according to an increase of a time based differential of the steering torque of the steering wheel at a rate which is higher when directions of the time based differential of the steering torque of the steering wheel and a time based differential of rotational angle of the steering wheel during operation of the wheel slip control system are different from each other than when those directions are the same with each other.

2. A control device according to claim 1, wherein the computing system increases the target value of assisting steering force according to the increase of the time based differential of the steering torque of the steering wheel at a rate that is decreased along with increase of vehicle speed.

3. A control device according to claim 1, wherein the computing system decreases the target value of assisting steering force according to an increase of a time based differential of steering angle of the steering wheel.

4. A control device according to claim 3, wherein the computing system decreases the target value of assisting steering force according to the increase of the time based differential of steering angle of the steering wheel at a rate that increases along with increase of vehicle speed.

5. A control device according to claim 3, wherein the computing system decreases the target value of assisting steering force according to the increase of the time based differential of steering angle of the steering wheel at a rate that decreases along with increase of steering torque of the steering wheel.

6. A control device according to claim 1, wherein, when operation of the wheel slip control system ends, the modification of the target value of assisting steering force during the operation of the wheel slip control system is continued until a determined time lapses from the time point of the end of the operation of the wheel slip control system.

7. A control device according to claim 1, wherein the computing system decreases the target value of assisting steering force along with increase of vehicle speed.

* * * * *